(12) United States Patent
Riccardi et al.

(10) Patent No.: US 11,340,250 B2
(45) Date of Patent: May 24, 2022

(54) SYSTEM FOR FUSING ACOUSTIC AND INERTIAL POSITION DETERMINATION

(71) Applicant: InvenSense, Inc., San Jose, CA (US)

(72) Inventors: Sebastian Riccardi, Brezins (FR); Karthik Katingari, San Jose, CA (US); Joe Youssef, Sant Egreve (FR)

(*) Notice: Subject to any disclaimer, the term of this patent is extended or adjusted under 35 U.S.C. 154(b) by 839 days.

(21) Appl. No.: 16/212,075

(22) Filed: Dec. 6, 2018

(65) Prior Publication Data

US 2019/0170785 A1 Jun. 6, 2019

Related U.S. Application Data

(60) Provisional application No. 62/595,562, filed on Dec. 6, 2017.

(51) Int. Cl.
| | | |
|---|---|---|
| G01P 13/00 | (2006.01) | |
| G01S 11/14 | (2006.01) | |
| G01S 11/12 | (2006.01) | |
| G01S 11/16 | (2006.01) | |
| G06F 3/038 | (2013.01) | |
| G06F 3/033 | (2013.01) | |
| G01C 21/16 | (2006.01) | |
| G06F 3/0346 | (2013.01) | |
| G01S 5/18 | (2006.01) | |
| G06F 3/01 | (2006.01) | |
| G01D 18/00 | (2006.01) | |

(52) U.S. Cl.
CPC ............ *G01P 13/00* (2013.01); *G01C 21/165* (2013.01); *G01D 18/00* (2013.01); *G01S 5/18* (2013.01); *G01S 11/12* (2013.01); *G01S 11/14* (2013.01); *G01S 11/16* (2013.01); *G06F 3/017* (2013.01); *G06F 3/033* (2013.01); *G06F 3/038* (2013.01); *G06F 3/0346* (2013.01)

(58) Field of Classification Search
USPC ........................................................ 377/128
See application file for complete search history.

(56) References Cited

U.S. PATENT DOCUMENTS

2014/0293748 A1* 10/2014 Altman ................. G01S 3/8083
367/127
2016/0341579 A1* 11/2016 Kimura .............. G01C 19/5776

* cited by examiner

*Primary Examiner* — Paul D Lee (57) ABSTRACT

A synchronization system for an acoustic signal-based and inertial signal-based positioning system is provided that generates a magnetic field as a synchronization signal. The modulated magnetic synchronization signal is transmitted by a transmitter of the positioning system and received by the receiver of the positioning system. The receiver may make an acoustic position determination for the transmitter based on a received modulated synchronization signal and may make an inertial position determination for the transmitter based on the received inertial signal, such that the acoustic position determination and the inertial position determination are fused.

17 Claims, 5 Drawing Sheets

SYSTEM FOR FUSING ACOUSTIC AND INERTIAL POSITION DETERMINATION

CROSS-REFERENCE TO RELATED APPLICATIONS

This application claims priority from and benefit of U.S. Provisional Patent Application Ser. No. 62/595,562, filed Dec. 6, 2017, which is entitled "System for determining position and orientation of a mobile device in 6 degrees of freedom," which is assigned to the assignee hereof and is incorporated by reference in its entirety.

FIELD OF THE PRESENT DISCLOSURE

This disclosure generally relates to motion sensors and more specifically to a transmitter in communication with a receiver, wherein the receiver determines position information for the transmitter.

BACKGROUND

The development of microelectromechanical systems (MEMS) has enabled the incorporation of a wide variety of sensors into mobile devices, such as cell phones, laptops, tablets, gaming devices and other portable, electronic devices. Non-limiting examples of such sensors include an accelerometer, a gyroscope, a magnetometer, a pressure sensor, a microphone, a proximity sensor, an ambient light sensor, an infrared sensor, and the like. Further, sensor fusion processing may be performed to combine the data from a plurality of sensors to provide an improved characterization of the device's motion or orientation.

Numerous applications may benefit from the use of such sensors to determine the position and/or motion of a portable device. As one non-limiting example, Augmented Reality (AR) systems and Virtual reality (VR) systems often have a Head Mounted Display (HMD) for which it would be desirable to provide user input via a portable device, such as a controller that is either worn or held in a user's hand. Correspondingly, the HMD may employ position information about the controller for a wide range of user inputs, including recognition of predetermined gestures or creating a correspondence between the physical controller and a virtual object, such as a cursor or pointer.

Although MEMS technologies have allowed the widespread use of the types of sensors discussed above, one disadvantage associated with using these relatively low cost devices is performance degradation due to accumulated sensor drifts and bias. In particular, these characteristics can complicate the use of motion sensors to make accurate translational determinations. One strategy for mitigating the drawbacks associated with motion sensors, including inertial sensors such as accelerometer and gyroscopes, is to provide a supplemental position determination system that may be used to correct or enhance the determinations of the motion sensors. For example, acoustic signal-based positioning systems may be used with many types of portable devices such as smartphones, tablets, laptops, and, in the context of the HMD application discussed above, controllers. Indeed, acoustic signal-based positioning systems may be used to provide information about the relative position of a controller with respect to the HMD, and by extension, the user. A conventional acoustic signal-based positioning system includes a transmitter that emits acoustic signals and a receiver which receives the emitted signals. The receiver measures the propagation time delay, referred to as Time of Arrival ("TOA"), of the received acoustic signal, and may multiply the TOA by the speed of sound, to determine a position of the transmitter. Using multiple receivers may allow triangulation and/or another form of multilateration, and provide for the determination of a position in two or even three dimensions.

It would be desirable to employ an inertial-based positioning system in conjunction with an acoustic signal-based positioning system to leverage the relative strengths of the different systems. To address this need and others, this disclosure is directed to techniques for fusing position information based on an inertial sensor system with position information from an acoustic system as described in the materials below.

SUMMARY

As will be described in detail below, this disclosure includes a positioning system with a transmitter that includes an acoustic signal transmitter configured to transmit a modulated acoustic signal, a magnetic synchronization signal transmitter configured to transmit a modulated magnetic synchronization signal and at least one inertial sensor assembly, having at least one sensor, configured to receive the modulated magnetic synchronization signal as an input and configured to transmit an inertial signal. The positioning system also has a receiver that includes an acoustic signal receiver configured to receive the transmitted modulated acoustic signal, a magnetic synchronization signal receiver configured to receive the transmitted modulated magnetic synchronization signal, an inertial signal receiver configured to receive the transmitted inertial signal and at least one processor configured to receive the modulated acoustic signal from the acoustic signal receiver, the modulated magnetic synchronization signal from the magnetic synchronization signal receiver and the inertial signal from the inertial signal receiver on a same time domain to determine a position of the transmitter based on the received modulated synchronization signal, a determined time delay of the received modulated acoustic signal and the received inertial signal.

This disclosure is also directed to a portable transmitter that includes an acoustic signal transmitter configured to transmit a modulated acoustic signal, a magnetic synchronization signal transmitter configured to transmit a modulated magnetic synchronization signal and at least one inertial sensor assembly, having at least one sensor, configured to receive the modulated magnetic synchronization signal as an input and configured to transmit a inertial signal.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a Motion Processor Unit (MPU) or Sensor Processing Unit (SPU) and a microprocessor, a plurality of microprocessors, one or more microprocessors in conjunction with an MPU/SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

Figure 1:
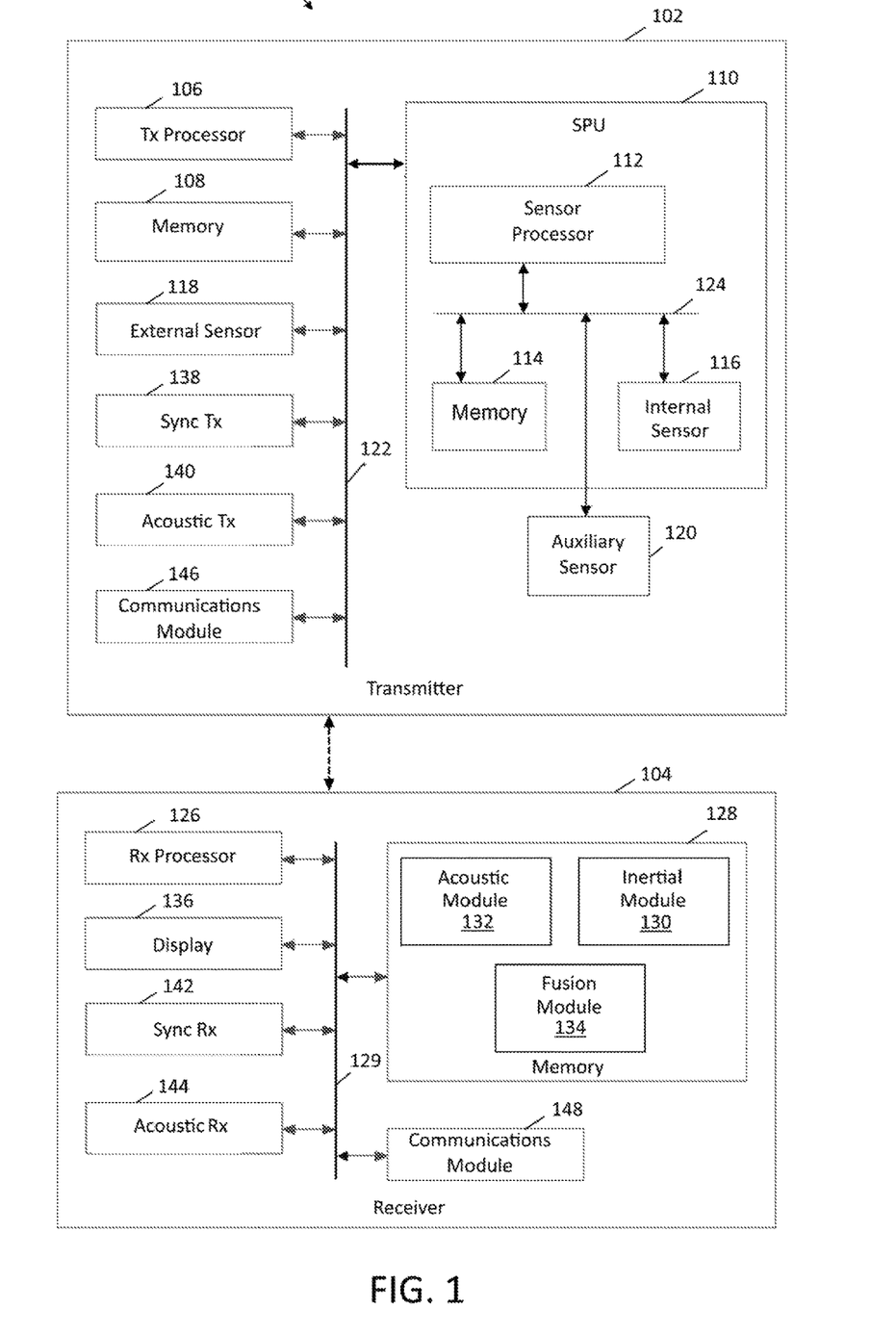
FIG. 1 is a schematic diagram of positioning systems having a transmitter and receiver; according to an embodiment.

Details regarding one embodiment of a system 100 including features of this disclosure are depicted as high level schematic blocks in FIG. 1. As will be appreciated, transmitter 102 and receiver 104 are implemented as a portable device or apparatus, such as a controller and head mounted display (HMD). Although both transmitter 102 and receiver 104 are generally moveable in space by a user, the context of this disclosure is concerned with making relative position determinations for transmitter 102 in relation to receiver 104 as an indication of its position, motion and/or orientation in space. As used herein, the term "position" unless indicated otherwise may refer to either or both position and orientation. Further, given that motion is a change in position or orientation, position information may also include motion information. For example, a given sequence of orientations and/or positions may be associated with a predetermined gesture that may be recognized to provide a user input to system 100. Likewise, a given sequence of orientations and/or positions may also be mapped to a virtual object for controlling that object as a user input to system 100. Correspondingly, receiver 104 may be a dedicated HMD or other AR/VR device, or may be another portable device having capabilities that may be leveraged to provide some degree of functionality associated with a HMD, including a mobile phone (e.g., cellular phone, a phone running on a local network, or any other telephone handset), wired telephone (e.g., a phone attached by a wire), personal digital assistant (PDA), video game player, video game controller, navigation device, activity or fitness tracker device (e.g., bracelet or clip), smart watch, other wearable device, mobile internet device (MID), personal navigation device (PND), digital still camera, digital video camera, binoculars, telephoto lens, portable music, video, or media player, remote control, or other handheld device, or a combination of one or more of these devices. Transmitter 102 is a device that is used in conjunction with receiver 104, such as a dedicated controller or other input device, or may also be another type of portable device including any of those noted above that provides this functionality. Further, multiple transmitters 102 can be used, such as two or more separate controllers in which each is capable of independent movement, with each capable of providing user input individually or in combination with one or more other transmitters 102. More generally, transmitter 102 is a device in communication with receiver 104 that would benefit from determining its position, orientation or motion relative to the receiver, for example, for the purpose of providing user input.

As shown, transmitter 102 includes a transmitter processor 106, which may be one or more microprocessors, central processing units (CPUs), or other processors to run software programs, which may be stored in memory 108, associated with the functions of device 100. Transmitter 102 includes at least one sensor assembly, as shown here in the form of integrated sensor processing unit (SPU) 110 featuring sensor processor 112, memory 114 and internal sensor 116. Memory 114 may store algorithms, routines or other instructions for processing data output by internal sensor 116 and/or other sensors as described below using logic or controllers of sensor processor 112, as well as storing raw data and/or motion data output by internal sensor 116 or other sensors. Depending on the architecture, either memory 114 or memory 108 or a combination may be used for storing data, executable instructions or any other suitable operations involving transmitter 102. Internal sensor 116 may be one or more sensors for measuring motion of transmitter 102 in space, including inertial sensors such as an accelerometer and a gyroscope, or other motion sensors including a magnetometer, a pressure sensor or others. Depending on the configuration, SPU 110 measures one or more axes of rotation and/or one or more axes of acceleration of the device. In one embodiment, internal sensor 116 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, with the sensor readings transmitted to receiver 104 such that a sensor fusion operation may be performed as described below to combine data from internal sensor 116 to provide a six axis determination of motion or six degrees of freedom (6DOF). Alternatively or in addition, sensor processor 112, or other processing resources of transmitter 102, may perform the sensor fusion. As desired, internal sensor 116 may be implemented using Micro Electro Mechanical System (MEMS) to be integrated with SPU 110 in a single package. Exemplary details regarding suitable configurations of transmitter processor 106 and SPU 110 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. Suitable implementations for SPU 110 in transmitter 102 are available from InvenSense, Inc. of San Jose, Calif. In some embodiments, one or more motion algorithm layers may provide motion algorithms for lower-level processing of raw sensor data provided from internal or external sensors. Further, a sensor device driver layer may provide a software interface to the hardware sensors of transmitter 102. Some or all of these layers can be provided in memory 108 for access by transmitter processor 106, in memory 114 for access by sensor processor 112, or in any other suitable architecture.

Alternatively or in addition, transmitter 102 may implement a sensor assembly in the form of external sensor 118. This is optional and not required in all embodiments. External sensor may represent one or more sensors as described above, such as an accelerometer and/or a gyroscope. As used herein, "external" means a sensor that is not integrated with SPU 110 and may be remote or local to transmitter 102. Also alternatively or in addition, SPU 110 may receive data from an auxiliary sensor 120 configured to measure one or more aspects about the environment surrounding transmitter 102. This is optional and not required in all embodiments. For example, a pressure sensor and/or a magnetometer may be used to refine motion determinations made using internal sensor 116. In one embodiment, auxiliary sensor 120 may include a magnetometer measuring along three orthogonal axes and output data to be fused with the gyroscope and accelerometer inertial sensor data to provide a nine axis determination of motion. In another embodiment, auxiliary sensor 120 may also include a pressure sensor to provide an altitude determination that may be fused with the other sensor data to provide a ten axis determination of motion. Again, the sensor fusion involving this optional data from either or both of external sensor 118 and auxiliary sensor 120 may be performed at receiver 104, at transmitter 102, or both. Although described in the context of one or more sensors being MEMS based, the techniques of this disclosure may be applied to any sensor design or implementation.

In the embodiment shown, transmitter processor 106, memory 108, SPU 110 and other components of transmitter 102 may be coupled through bus 122, while sensor processor 112, memory 114, internal sensor 116 and/or auxiliary sensor 120 may be coupled though bus 124, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of transmitter 102, such as by using a dedicated bus between transmitter processor 106 and memory 108.

In turn, receiver 104 may include receiver processor 126 and memory 128 to implement any desired operations, coupled by bus 129 which also couples the other functional components of receiver 104. As described in further detail below, this may include using motion sensor data, including inertial sensor information, from transmitter 102 to determine any suitable aspect of information regarding the relative position, orientation and/or motion of transmitter 102 with respect to receiver 104 by executing instructions stored in memory 128 as indicated by inertial module 130. Further, memory 128 may also include instruction represented as acoustic module 132 to process information associated with acoustic signal-based positioning of transmitter 102 as also described in further detail below. Still further, memory 128 may include fusion module 134 which may include instructions for integrating information determined by inertial module 130 and acoustic module 132. In some embodiments, such as when receiver 104 functions as a HMD, display 136 may be configured to deliver content to a user, such as stereoscopic information used simulate a three dimensional virtual or augmented reality environment. In this schematic representation, display 136 may also be considered as delivering audio information, such as through a suitable speaker system. Receiver 104 may also comprise a sensor processing unit like SPU 110 with internal sensors, such as e.g. inertial sensor, and may also comprise external sensors like external sensor 118 (not shown). As such, these sensors in receiver 104 may be used to determine the location, position, and/or orientation of receiver 104, independent or dependent from transmitter 102.

Multiple layers of software can be provided in memory 128, which may be any combination of computer readable medium such as electronic memory or other storage medium such as hard disk, optical disk, etc., for use with the receiver processor 126. For example, an operating system layer can be provided for transmitter 102 to control and manage system resources in real time, enable functions of application software and other layers, and interface application programs with other software and functions of receiver 104. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single receiver 104, and in some of those embodiments, multiple applications can run simultaneously.

Algorithms, routines or other instructions for processing sensor data may be employed by inertial module 130 to perform any of the operations associated with the techniques of this disclosure, such as determining the motion, location, distance and/or orientation of portable transmitter 102 in relation to receiver 104. Determining the motion or orientation of portable transmitter 102 may involve sensor fusion or similar operations performed by receiver processor 126. Such determinations may be absolute or relative as warranted. Examples of determining the position changed based on motion sensors may be found in co-pending, commonly owned U.S. patent application Ser. No. 14/537,503, filed Nov. 10, 2014, which is hereby incorporated by reference in its entirety.

As noted above, transmitter 102 and receiver 104 may include an acoustic signal-based positioning system, such that transmitter 102 includes synchronization signal transmitter 138 and an acoustic signal transmitter 140. Further details regarding a suitable acoustic signal-based positioning system may be found in U.S. Pat. No. 9,897,682, which is hereby incorporated by reference herein in its entirety. Acoustic signal transmitter 138 transmits a modulated ultrasonic signal, such as a modulated continuous ultrasonic signal. For example, a signal range of the modulated continuous ultrasonic signal may vary between around 20 and 80 kHz and/or up to 200 kHz. The modulated continuous ultrasonic signal comprises a modulated continuous wave ultrasonic signal having a carrier signal part and a baseband signal part that is modulated onto the carrier signal part. Likewise, receiver 104 correspondingly includes synchronization signal receiver 142 and an acoustic signal receiver 144. In some embodiments, acoustic signal receiver 140 may be one or more microphones. In some embodiments, acoustic receiver 144 may be capable of receiving acoustic signals emitted by acoustic signal transmitter 140.

The received signals may be compared to an expected signal by acoustic module 132 according to instructions stored in memory 128 and a stored expected signal or an expected signal generated by receiver processor 126, for example. In some embodiments, the expected signal may correspond to a replica of a pre-defined modulated continuous signal stored in memory 128, or a calculated modulated continuous wave signal, based on a template, model, and/or features stored in memory 128. In some embodiments, receiver processor 126 may compare received acoustic signals using carrier and baseband correlation. Comparing received acoustic signals with an expected acoustic signal is further discussed in U.S. Pat. No. 8,184,504, which is hereby incorporated by reference herein in its entirety.

Synchronization signal transmitter 138 transmits a modulated synchronization signal that may be detected by synchronization receiver 144 and used by acoustic module 132 to initiate a delay count for receiving the modulated acoustic signal from acoustic signal transmitter 140, which may have a slower speed than the modulated synchronization signal transmitted from synchronization signal transmitter 106. The delay count may then be used in determining a time delay of the received acoustic signal, wherein the time delay may be used along with a speed of propagation of the acoustic signal to determine a distance between transmitter 102 and receiver 104. In some embodiments, the transmitted acoustic signal has a known speed, for example the speed of sound in air. In some embodiments, the modulated synchronization signal may have a very small time delay with respect to the distance between transmitter 102 and receiver 104. The received modulated synchronization signal may also be used to synchronize clocks between transmitter 102 and receiver 104 to compensate for clock inaccuracy and/or drift. In some embodiments, a synchronization mechanism is included in receiver 104, which may be stored, for example, in memory 128 and executed by the receiver processor 126.

In some embodiments, acoustic module 132 may be capable of determining a position of transmitter 102 with respect to receiver 104 by measuring the time delay of the transmitted acoustic signals through a Line Of Sight (LOS). In some embodiments, a position of transmitter 102 with respect to receiver 104 may be determined based on cross-correlating the carrier signal and baseband signal from the received acoustic signal. In some embodiments, acoustic module 132 includes Fast Fourier Transform (FFT) capability and may be used to perform phase and amplitude analysis of the received acoustic signals. Moreover, acoustic module 132 may compare received acoustic signals with an expected signal that may be calibrated based on differences in phase, amplitude, and/or group delay. Correspondingly, position information including distance between transmitter 102 and receiver 104 may be determined based on the time delay of the acoustic signal from transmitter 102 to receiver 104 on a LOS, e.g. the shortest distance between transmitter 102 and receiver 104. A position of transmitter 102 may be determined based on a triangulation or another form of multilateration of the distances determined from receiver 104. To determine a position in additional dimensions, additional receiving devices and/or additional acoustic signal receivers 144 may be used. In some embodiments, gain is processed using summing. Based on the received signal, acoustic module 132 may calculate the time delay based on the carrier and baseband signal and may perform triangulation or other form of multilateration to determine the position of the transmitting device as a function of time.

According to the techniques of this disclosure, the acoustic signal-based positioning system may use a modulated magnetic synchronization signal, with synchronization signal transmitter 138 being a magnetic synchronization signal transmitter 106 and synchronization signal receiver 142 being a magnetic synchronization signal receiver 106. Magnetic synchronization signal transmitter 138 transmits a magnetic synchronization signal that is received by magnetic synchronization signal receiver 142 such that magnetic synchronization signal transmitter 138 is magnetically coupled to magnetic synchronization signal receiver 142. In some embodiments, the modulated magnetic synchronization signal may have a same modulation as an acoustic signal transmitted by acoustic signal transmitter 140.

Transmitter 102 and receiver 104 may employ communications modules 146 and 148, respectively, to communicate position information obtained from sensors in SPU 110, in the form of raw sensor data, a determination obtained through a fusion operation, or any other relevant information. In some embodiments, communications module 126 may employ a Wireless Local Area Network (WLAN) conforming to Institute for Electrical and Electronic Engineers (IEEE) 802.11 protocols, other systems including cellular-based and WLAN technologies such as Universal Terrestrial Radio Access (UTRA), Code Division Multiple Access (CDMA) networks, Global System for Mobile Communications (GSM), IEEE 802.16 (WiMAX), Long Term Evolution (LTE), other transmission control protocol, internet protocol (TCP/IP) packet-based communications, or the like may be used. In some embodiments, multiple communication systems may be employed to leverage different capabilities. Typically, communications involving higher bandwidths may be associated with greater power consumption, such that other channels may utilize a lower power communication protocol such as BLUETOOTH®, ZigBee®, ANT or the like. Further, while wireless communication allow for greater freedom of movement, a wired connection may be used for the communication of some information between various components of the system depending on the embodiment. In addition, transmitter 102 and receiver 104 may communicate either directly or indirectly, such as through one or multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Figure 2:
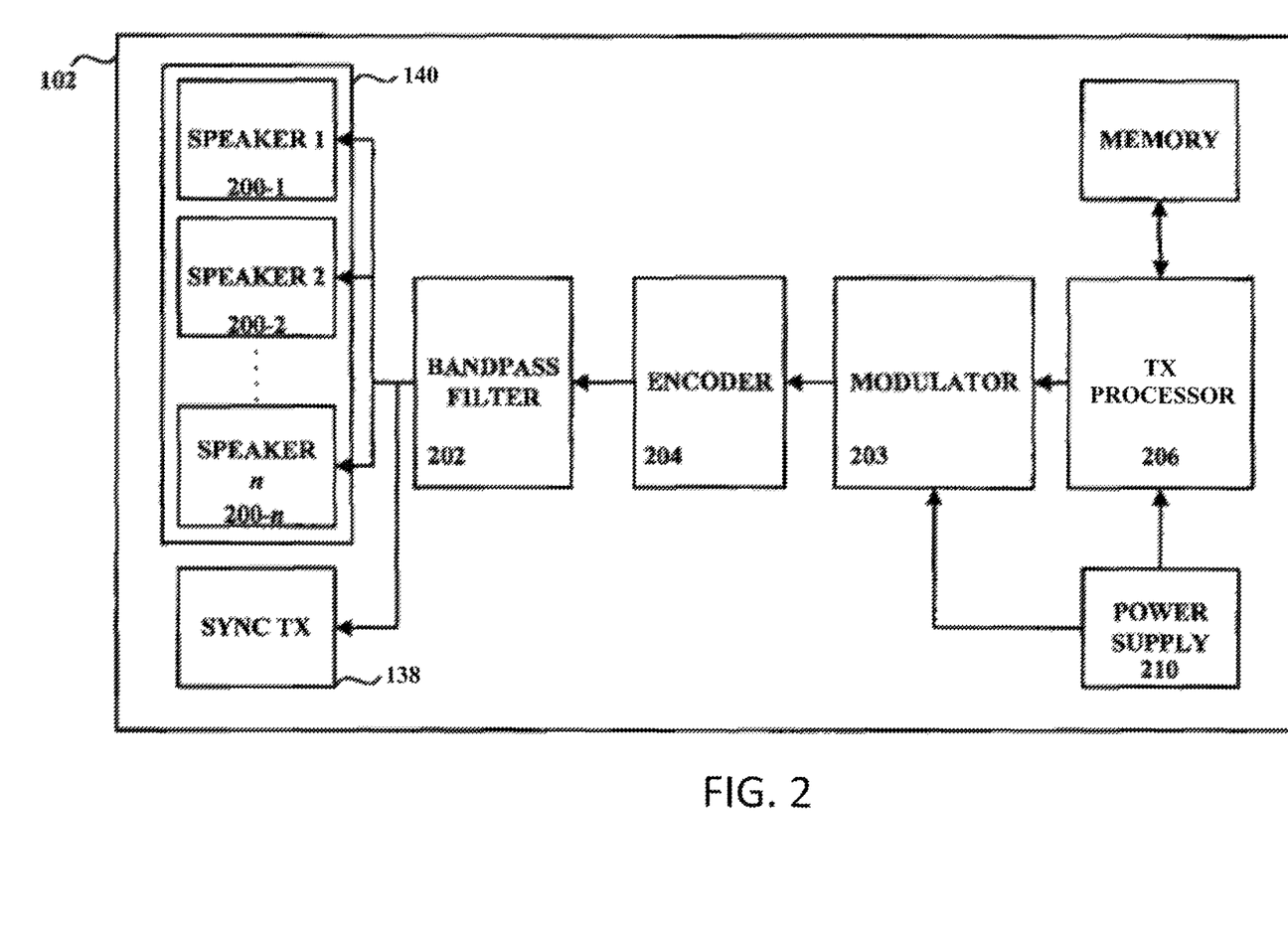
FIG. 2 is a schematic diagram of a transmitter of a positioning system; according to an embodiment.

FIG. 2 is a diagram illustrating aspects of transmitter 102, consistent with some embodiments. As shown in FIG. 2, acoustic signal transmitter 138 may include one or more speakers 200-1-200-$n$ (referred to collectively as speakers 200) capable of transmitting an acoustic signal. In some embodiments, speakers 200 may each be capable of transmitting a modulated continuous ultrasonic signal having a signal range of between around 20 and 80 kHz and/or up to 200 kHz. In some embodiments, the modulated continuous ultrasonic signal transmitted by speakers 200 may include a carrier signal part and a baseband signal part that is modulated onto the carrier signal part. Further, speakers 200 may be oriented at different locations on transmitter 102, different angles, different orientations, and the like in order to transmit ultrasonic signals to receiver 104 at different distances to permit triangulation of the ultrasonic signals for determining a position of transmitter 102 with respect to receiver 104. Further, speakers 200 may be located at different locations on transmitter 102 to transmit ultrasonic signals for determining an attitude or angle of transmitter 102 with respect to receiver 104.

Magnetic synchronization signal transmitter 138 may be or include a coil or transformer coupled driven by a power source. In some embodiments, magnetic synchronization signal transmitter 138 may correspond to a coil or a transformer coupled to acoustic signal transmitter 140 for boosting the acoustic signal. The magnetic field or signal generated by magnetic synchronization signal transmitter 138 may establish a magnetic coupling with the detecting magnetic synchronization signal receiver 142. This generated field establishing the magnetic coupling acts as a modulated magnetic synchronization signal between magnetic synchronization signal transmitter 138 and magnetic synchronization signal receiver 142. In some embodiments, the modulated magnetic synchronization signal or field provides a timing retrieval accuracy of less than 30 ns. Magnetic synchronization signal transmitter 138 may also generate a spread spectrum modulated magnetic synchronization signal by spreading the energy of the field across a frequency band to increase redundancy and robustness of the generated modulated magnetic synchronization signal. In some embodiments, the larger the bandwidth of the spread, the more accurate of timing recovery achieved by the synchronization. In some embodiments, magnetic synchronization signal transmitter 138 may be coupled to a different power source than acoustic signal transmitter 140 and, thus, a separate electrical path or channel than acoustic signal transmitter 140.

Acoustic signal transmitter 140 and magnetic synchronization signal transmitter 138 may be coupled to bandpass filter 202, which may be capable of filtering a modulated signal generated by modulator 203 so that acoustic components of the modulated signal are sent to acoustic signal transmitter 140 and non-acoustic components of the signal are sent to magnetic synchronization signal transmitter 138. In some embodiments, modulator 203 may be a delta-sigma modulator capable of modulating a carrier signal part onto a baseband signal part. Bandpass filter 202 may be capable of filtering the sigma-delta out of band components from the modulated signals produced by modulator 203 to reduce current consumption. Moreover, both the baseband signal part and the carrier signal part may be modulated for enhanced timing accuracy and decreased interference. In some embodiments, both the magnetic synchronization signal and the acoustic signal may be modulated by modulator 203. In some embodiments, the magnetic synchronization signal and the acoustic signal may be modulated in at least one of amplitude, frequency, and phase by modulator 203. In some embodiments, the magnetic synchronization signal and acoustic signal may be modulated at a modulation period that is sufficiently large to allow determining a timing within the modulation period.

Modulator 203 may be coupled to transmitter processor 106 which is further coupled to memory 108, or other suitable processing resources of transmitter 102, and a power supply 210. Correspondingly, transmitter processor 106 may control modulator 203 and generate signals for modulation by modulator 203 and transmission by acoustic signal transmitter 138 and magnetic synchronization signal transmitter 140. Power supply 210 may be a direct current power supply, an alternating current power supply, and may also include a battery. Consistent with some embodiments, if acoustic signal transmitter 140 has a large capacitive component, power supply 210 may be capable of driving magnetic synchronization signal transmitter 138 to have a matching inductance. In some embodiments, the inductance value may be fixed by magnetic synchronization signal transmitter 138. Using a matching inductive driver may cause a center frequency of the modulation to also be the center frequency of the resonator formed from the inductive driver and acoustic signal transmitter 140 thereby improving the efficiency and effectiveness of acoustic signal transmitter 140.

Figure 3:
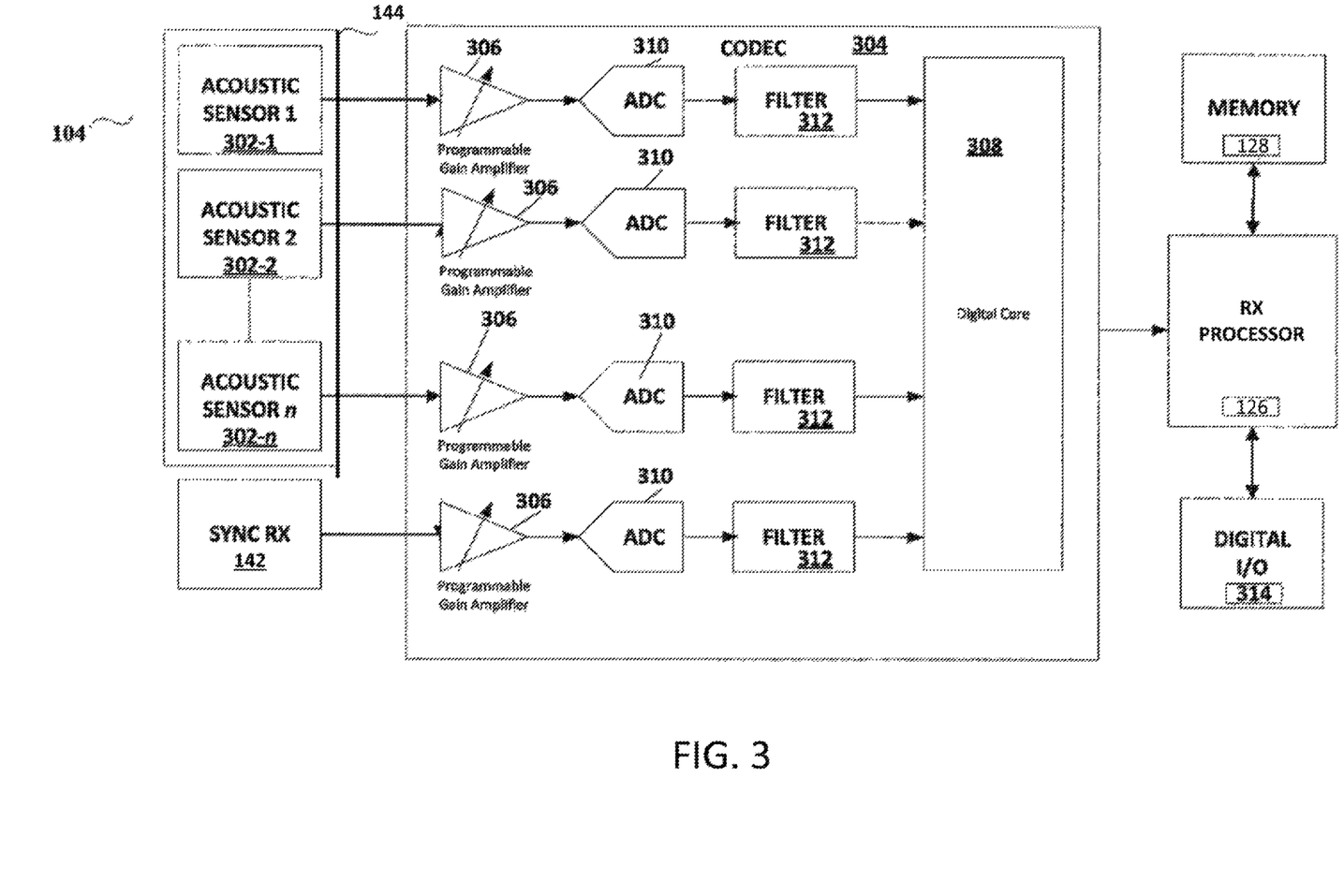
FIG. 3 is a schematic diagram of a receiver of a positioning system; according to an embodiment.

FIG. 3 is a diagram illustrating aspects of receiver 104, consistent with some embodiments. As shown in FIG. 3, acoustic signal receiver 144 may include acoustic sensors 302-1-302-n (referred to collectively as acoustic sensors 302). In some embodiments, acoustic sensors 302 may be microphones capable of detecting ultrasonic signals and, in further embodiments, may be microelectromechanical systems (MEMS) microphones. Acoustic signal receiver 144 may include as many acoustic sensors 302 as is required for positioning requirements, but may typically include a single acoustic sensor 302 for determining a position of transmitter 102 in one-dimension, two acoustic sensors 302 for determining a position of transmitter 102 in two dimensions, and three acoustic sensors 302 for determining a position of transmitter 102 in three dimensions. Additional acoustic sensors 302 may also be used to account for the possibility that one or more other acoustic sensors are not in a proper LOS relationship depending on the relative positions and orientation of transmitter 102 and receiver 104.

FIG. 3 illustrates a circuit with similar inputs. In that case, received acoustic and magnetic signals can be interchanged without having adverse impact on system performance. The same timing domain is used for a circuit for sampling microphone outputs, such as audio codecs, as is used for magnetic inputs. Audio codecs have usually a programmable gain amplifier followed by A/D converter. The samples from the A/D converter are streamed to an audio processor. In some embodiments, the acoustic signal and the magnetic signal are sampled simultaneously, in the same time domain of the audio codec. Sampling the magnetic signal in the same time domain in a synchronized manner to the audio sensors provides that the precise timing between magnetic and acoustic signal is kept. Sampling the magnetic (or RF) signal in the RE-front IC will not allow the level of synchronization as sampling both signals in the same time domain as in the audio codec. For instance, the RF circuit may have a timing offset and acoustic samples will have some time shift due to different time of jump-starting the RF circuit and the audio circuit. This is what the "same time domain" means.

As shown in FIG. 3, magnetic synchronization signal receiver 142 may be coupled to a similar input as acoustic signal receiver 144 such that modulated acoustic signals received by acoustic sensors 302-1 through 302-n and a modulated magnetic synchronization signal received by magnetic synchronization receiver 142 is provided for processing on the same timing domain. Consistent with some embodiments, the modulated magnetic synchronization signal may be produced by magnetic synchronization signal transmitter 138, and magnetic synchronization receiver 142, which includes a coil or similar feature for detecting the modulated magnetic synchronization signal and establishing a magnetic coupling. Although only one magnetic synchronization receiver 142 is shown in FIG. 3, additional synchronization receivers for receiving additional modulated magnetic synchronization signals or other synchronization signals may be included in some embodiments.

The modulated acoustic signal and modulated magnetic synchronization signal may be provided to a coder-decoder (CODEC) 304. In some embodiments, CODEC 304 may act as a co-processor to receiver processor 126. CODEC 304 may include pre-amplifiers 306, digitizers 310, and filters 312. In some embodiments, CODEC 304 may have more or fewer components, modules, circuits, and the like than what is shown in FIG. 3, for example a decoder may be included. Pre-amplifiers 306 may amplify the received modulated acoustic signals and modulated magnetic synchronization signals. Decoders 308 may then decode information encoded into the modulated acoustic signals and modulated magnetic synchronization signal by encoder 204. The decoded acoustic signals and magnetic synchronization signals may then be digitized by digitizers 310. In some embodiments, digitizers 310 may be an analog-to-digital converters (ADC) capable of digitizing the received signals for output to receiver processor 126. CODEC 304 may also include a filters 312 that may include one or more filtering components. Usually the filter removes out of band components in order to avoid aliasing during decimation. The one or more filtering components may be capable of dynamically filtering out imperfections or anomalies in the received acoustic signals and the received modulated magnetic synchronization signal, such as magnetic spikes or spurs. Moreover, if the magnetic synchronization signal is modulated with a large enough bandwidth, filter 312 may improve the quality of the received modulated magnetic synchronization signal while not adversely impacting the timing of the synchronization signal. In some embodiments, filters 312 may be decimation filters. Moreover, filters 312 may be located outside of CODEC 304 such that in some embodiments, received modulated acoustic signals and modulated magnetic synchronization signals are filtered in parallel with the processing and conditioning performed by CODEC 304. As is further illustrated in FIG. 3, CODEC 304 may include a digital core 308 that receives signals from filters 312 and provides them to receiver processor 126. Receiver processor 126 may be coupled to CODEC 304 by bus 129 to receive the signals from CODEC 304, which may also couple memory 128 and digital input and output 314. Digital I/O 314 may include any component capable of receiving digital output from receiver processor 126 or providing digital input to receiver processor 126.

As another example, receiver processor 126 may be capable of executing instructions for increasing a signal-to-noise ratio of the received synchronization and acoustic signals, that may include signal summing algorithms, differential correlation summing algorithms, and linear fitting algorithms. Although not shown, receiver 104 may include a phase-locked loop (PLL), a delay-locked loop (DLL), or a digital phase-locked loop (DPLL) for increasing a signal-to-noise ratio of the received synchronization and acoustic signals. In some embodiments, the delay or phase-locked loops may be circuits included in receiver 104 while in other embodiments, the loops may be encoded as algorithms that are executed by receiver processor 126. In some embodiments, receiver processor 126 may be capable of searching for an optimal drift and delay given an error cost function. The signal-to-noise ratio may be increased, in some embodiments, by adding additional magnetic synchronization signal receivers 142 on receiver 104 to improve the reception of the modulated magnetic synchronization signal. Moreover, receiver processor 126 may determine a received signal strength indication (RSSI) by determining a signal level of the received modulated magnetic synchronization signal to be used as a measure of distance between transmitter 102 and receiver 104.

Receiver 104 may include more or less components than shown in FIG. 3 according to some embodiments. Moreover, the other components shown in FIG. 3 may be coupled to bus 129, instead of being directly coupled to one or more other components. Furthermore, components shown in FIG. 3 may be shown as being part of a unitary system, but may also be part of a system where the components are separate but coupled and in communication. In general, the components shown in FIG. 3 are shown as examples of components in a receiver 104 capable of performing embodiments disclosed herein. However, a receiver 104 may have more or fewer components and still be capable of performing some embodiments disclosed herein.

Accordingly, acoustic module 132 may determine position information for transmitter 102 from the emitted modulated acoustic positioning signal and modulated magnetic synchronization signal, consistent with some embodiments. The modulated acoustic positioning signals are received from transmitter 102 by acoustic sensors 302 which, in some embodiments, may cause an electric signal to be generated by the received modulated acoustic signals for processing. The received modulated magnetic synchronization signals may be received by magnetic synchronization signal receiver 144, which may include a coil or hollow cylinder wrapped around a core, causing an electric signal to be generated for processing. In some embodiments, the received modulated acoustic signals and the received modulated magnetic signals may be received and sent for processing on a same time domain such that the received modulated acoustic signals and the received modulated magnetic signals may be processed in the same domain. The received modulated acoustic signals and the modulated magnetic synchronization signals may be decoded by decoder 308 of CODEC 304. In some embodiments, decoding may include extracting encoded information from the received modulated acoustic and modulated magnetic synchronization signals. The decoded signals may then be digitized by digitizer 310. Based on the received digitized signals, acoustic module 132 may measure a time delay between versions of the received acoustic signals and the received modulated magnetic synchronization signals. In some embodiments, each acoustic sensor 302 may receive a version of an acoustic signal transmitted by a speaker 200 of transmitter 102. Moreover, each acoustic sensor 302 may receive versions of an acoustic signal transmitted by a different speaker 200 of transmitting device. Due to the speed of the acoustic signal, there is an associated time of flight associated with each received acoustic signal such that the acoustic signal may be received after a certain time delay from emission. Since the modulated magnetic synchronization signal may be received by magnetic synchronization signal receiver 110 almost instantaneously, the received modulated magnetic synchronization signal may be used to determine a time delay associated with the time of flight of each version of the received acoustic signal.

The measured time delay may then be converted to at least a first distance and a second distance. In some embodiments, each version of the received acoustic signal may be used by acoustic module 132 to determine a time delay, and each time delay may be used to determine a distance by knowing the speed of the acoustic signal and the time delay. Acoustic module 132 may then triangulate the first distance and the second distance to determine a position of transmitter 102. The determined position may have a one-dimensional, two-dimensional, or three-dimensional position based on the number of speakers 200 in transmitter 102 and the number of acoustic sensors 302 in receiver 104. Moreover, in addition to a position, an attitude or angle of transmitter 102 may be determined based on the position of speakers 200.

Consequently, embodiments as described herein may provide an acoustic signal-based positioning system that may be synchronized by establishing a magnetic coupling between a transmitter and the receiver. The magnetic coupling may be established by a modulated magnetic synchronization signal generated by a synchronization signal generator that may be integrated with the transmitter device more easily than conventional synchronization systems. Moreover, the modulated magnetic synchronization signal may be received by a synchronization signal receiver that may be integrated within the receiver and received on a same path as the acoustic signals removing the need for dedicated synchronization signal processing hardware.

From the above materials, it will be appreciated that inertial module 130 determines position information regarding transmitter 102 based on motion sensor data, such as inertial sensor data from SPU 110, while acoustic module 132 determines position information regarding transmitter 102 based on the received acoustic and synchronization signals. Correspondingly, fusion module 134 functions to combine the position information determined by each of the inertial module 130 and acoustic module 132 in order to improve the characterization of the relative position, motion and/or orientation of transmitter 102 with respect to receiver 104. In order to more accurately combine the position information determined by these separate systems, it is required to be able to correlate the respect timing information of each system and thereby synchronize the systems. According to the techniques of this disclosure, this is accomplished by using the modulated magnetic synchronization signal of the acoustic signal-based positioning system in conjunction with the inertial-based positioning system.

Figure 4:
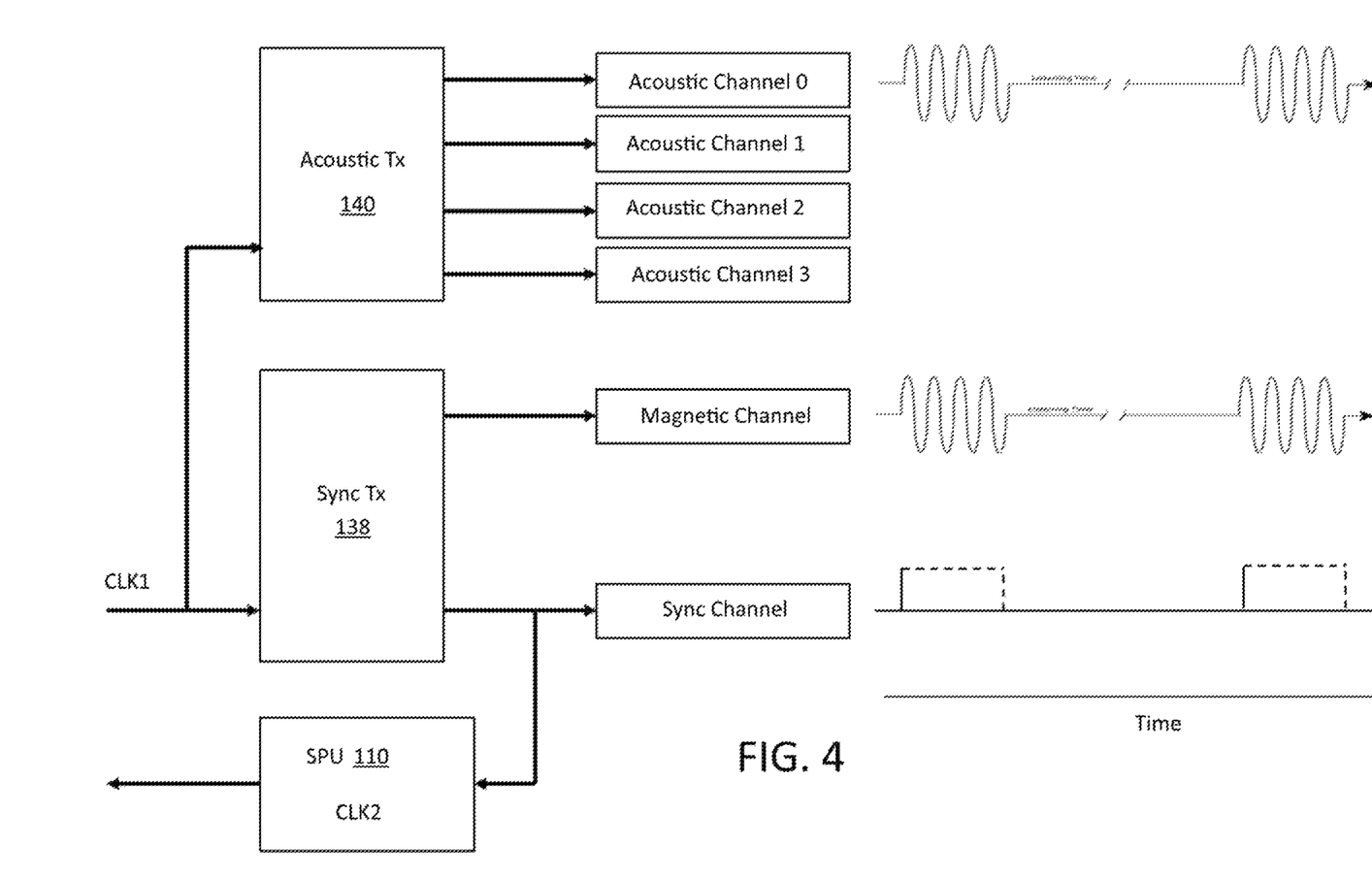
FIG. 4 is a schematic diagram showing synchronization between an acoustic signal and an inertial signal; according to an embodiment.
Figure 5:
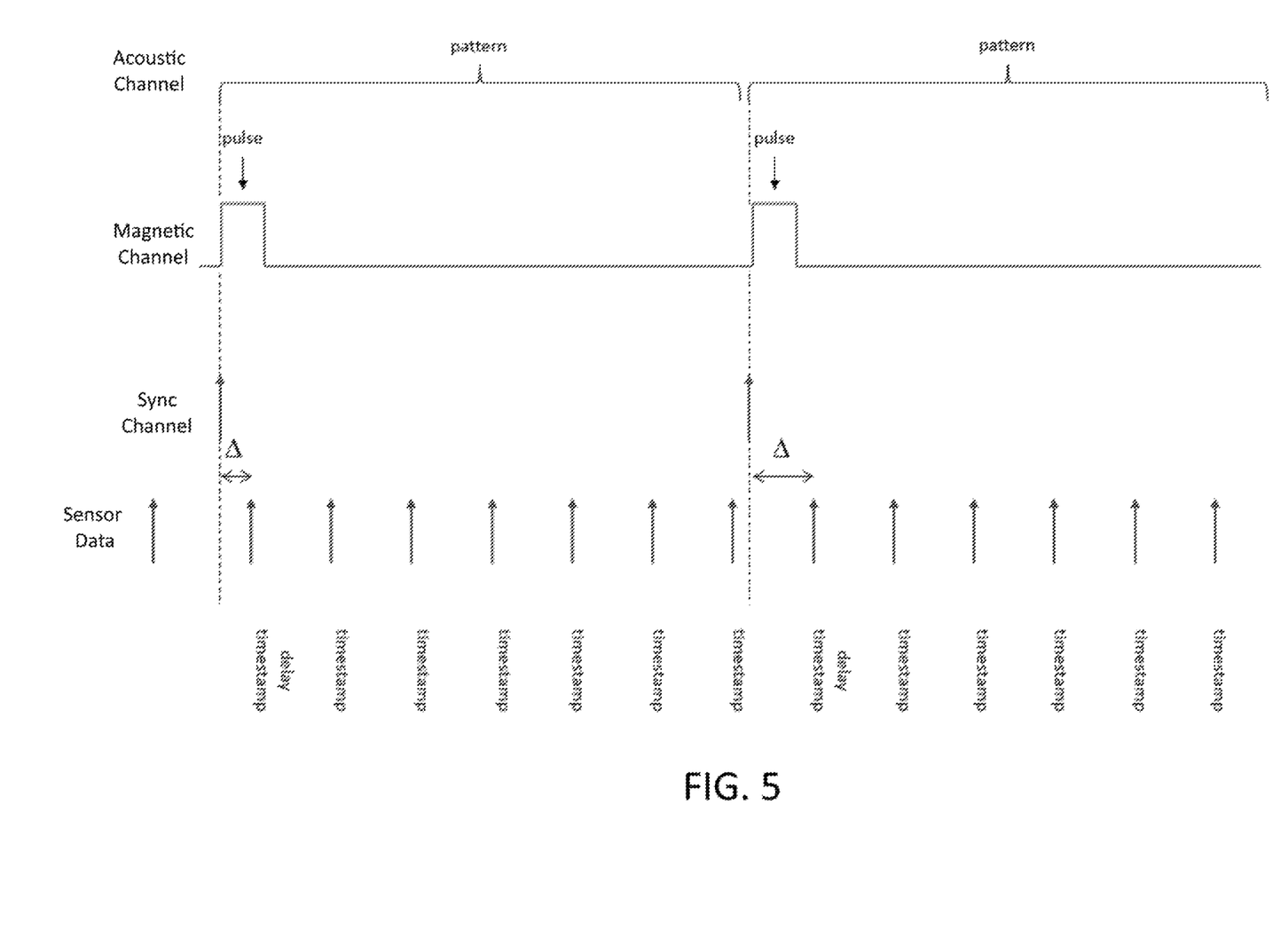
FIG. 5 is a schematic timing diagram showing synchronization between an acoustic signal and an inertial signal; according to an embodiment.

The coordinating the acoustic signal-based positioning system and the inertial-based positioning system is schematically depicted in FIG. 4, which shows aspects of each system as implemented in transmitter 102. In particular, the output of acoustic signal transmitter 140, represent here by the four indicated channels of modulated acoustic signal, is aligned with the output of magnetic synchronization signal transmitter 138 on the magnetic channel as shown in order to represent the synchronization of the modulated acoustic and magnetic signals. Acoustic signal transmitter 140 and magnetic synchronization signal transmitter 138 may be driven by a common clock, CLK1, such as that associated with transmitter processor 106. However, SPU 110 and its sensor data may utilize a different clock, such as CLK2 as indicated. CLK2 may be an internal clock generated within SPU 110. Similar to the clock difference between transmitter 102 and receiver 104 discussed above, for accurate fusion of the position information based on motion sensor data and the position information based on acoustic sensor data, any clock drift and/or clock inaccuracy has to be corrected. Thus, magnetic synchronization signal transmitter 138 may simultaneously output a signal to SPU 110 as indicated by the synchronization channel in FIG. 4. Synchronization signal transmitter 138 may output a synchronization pulse, and as may be seen, the rising edge of the synchronization channel signal may be aligned with both the start of the acoustic signals on the acoustic channels as well as the magnetic channel. The synchronization channel may be connected to a dedicated synchronization input pin on the SPU or sensor, and SPU 110 may be configured to detect rising edges on the synchronization channel. In turn, SPU 110 may determine any time differential between its sensor readings and the magnetic synchronization signal. Details of the sensor data synchronization are schematically shown in the timing diagram of FIG. 5. The top trace indicates the repeating pattern, or modulation pattern, of an acoustic signal transmitted on the acoustic channel by acoustic signal transmitter 140.

Next, the magnetic channel is shown, with the modulated magnetic synchronization signal having a pulse that is aligned with the start of the acoustic signal pattern as sent by magnetic synchronization signal transmitter 138. The rising edge of the synchronization channel as input to SPU 110 on the dedicated synchronization input pin is shown as the up arrow that is aligned with the beginning of the pulse of the modulated magnetic synchronization signal. Correspondingly, SPU 110 may determine a timing delay $\Delta$ between the sensor data samples, also indicated as up arrows, and the synchronization signal. Timing delay $\Delta$ is determined by starting a counter when a rising edge is detected on the dedicated synchronization input pin, and the counter is stopped at the first sensor data after the synchronization signal. The sensor data of SPU 110 is timestamped based on internal clock CLK2 of SPU 110, as is indicated in the bottom trace of FIG. 5. By combining the timing delay $\Delta$ with the timestamp of the first received sensor data, the timestamp of the synchronization signal based on internal clock CLK2 of SPU 110 is determined. The timestamped sensor data from SPU 110, together with the timestamped synchronization signal, are then transferred from transmitter 102 to receiver 104, for example using communications module 146 to communications module 148. This transmission may be performed using e.g. BLUETOOTH protocols. The data communicated to receiver 104 comprises the sensor data and the associated timestamp data, and, when a synchronization signal is detected, also comprises a timestamp for the received synchronization signal, or the timing delay $\Delta$ with respect to the received synchronization signal. Fusion module 134 then uses the received data and timestamps so that position information determined by inertial module 130 may be aligned with position information determined by acoustic module 132. By comparing the timestamp of the synchronization signal based on clock CLK2 of SPU 110, and the timing information of the magnetic synchronization signal received at receiver 104, the timestamped sensor data can be aligned with the acoustic data received at receiver 104. In the embodiment shown in FIG. 5, the acoustic signal pattern repeats and another pulse is transmitted by magnetic synchronization signal transmitter 138 at the beginning of this next pattern. Similarly, another synchronization signal is sent to SPU 110 so that a new timing delay $\Delta$ may be determined and applied in combination with the following sensor data timestamps.

According to the above discussion, a positioning system of this disclosure may include a transmitter having an acoustic signal transmitter configured to transmit a modulated acoustic signal, a magnetic synchronization signal transmitter configured to transmit a modulated magnetic synchronization signal and at least one inertial sensor assembly, having at least one sensor, configured to receive the modulated magnetic synchronization signal as an input and configured to transmit an inertial signal. The positioning system also has a receiver that includes an acoustic signal receiver configured to receive the transmitted modulated acoustic signal, a magnetic synchronization signal receiver configured to receive the transmitted modulated magnetic synchronization signal, an inertial signal receiver configured to receive the transmitted inertial signal and at least one processor configured to receive the modulated acoustic signal from the acoustic signal receiver, the modulated magnetic synchronization signal from the magnetic synchronization signal receiver and the inertial signal from the inertial signal receiver on a same time domain to determine a position of the transmitter based on the received modulated synchronization signal, a determined time delay of the received modulated acoustic signal and the received inertial signal.

In one aspect, the at least one processor may be configured to determine a position of the transmitter by making an acoustic position determination for the transmitter based on the received modulated synchronization signal and a determined time delay of the received modulated acoustic signal, making an inertial position determination for the transmitter based on the received inertial signal and fusing the acoustic position determination and the inertial position determination.

In one aspect, the acoustic position determination and the inertial position determination are synchronized based on the modulated magnetic synchronization signal.

In one aspect, the inertial sensor assembly may be configured to receive an indication of the start of the modulated magnetic synchronization signal as an input and determine timing data with respect to the inertial signal. The timing data may be a time delay between the received indication of the start of the modulated magnetic synchronization signal and acquired inertial sensor samples. The inertial sensor assembly may also determine a timestamp of the received indication of the start of modulated magnetic synchronization signal based on the time delay.

In one aspect, the inertial sensor assembly may have at least one of an accelerometer and a gyroscope. The inertial sensor assembly may also have a magnetometer.

In one aspect, the receiver may be a virtual reality display and/or an augmented reality display. The transmitter may be a handheld controller.

In one aspect, the positioning system may have an additional acoustic signal transmitter capable of independent movement configured to transmit a modulated acoustic signal, a magnetic synchronization signal transmitter configured to transmit a modulated magnetic synchronization signal and at least one inertial sensor assembly, having at least one sensor synchronized with the modulated magnetic synchronization signal and configured to transmit a inertial signal.

In one aspect, the inertial signal may be transmitted using radio frequency communication.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. In some configurations, a substrate portion known as a MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a sensor tracking module also referred to as Sensor Processing Unit (SPU) that includes at least one sensor in addition to electronic circuits. The sensor, such as a gyroscope, a magnetometer, an accelerometer, a microphone, a pressure sensor, a proximity sensor, or an ambient light sensor, among others known in the art, are contemplated. Some embodiments include accelerometer and gyroscope, which each provide a measurement along three axes that are orthogonal to each other. Such a device is often referred to as a 6-axis device. Other embodiments include accelerometer, gyroscope, and magnetometer, which each provide a measurement along three axes that are orthogonal to each other. Such a device is often referred to as a 9-axis device. Other embodiments may not include all the sensors or may provide measurements along one or more axes. The sensors may be formed on a first substrate. Other embodiments may include solid-state sensors or any other type of sensors. The electronic circuits in the SPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data may refer to processed and/or raw data. Processing may include applying a sensor fusion algorithm or applying any other algorithm. In the case of a sensor fusion algorithm, data from a plurality of sensors may be combined to provide, for example, an orientation of the device. In the described embodiments, a SPU may include processors, memory, control logic and sensors among structures.

A frame of reference for a portable device such as transmitter 102 may be the body frame, having three orthogonal axes. Switching from the body frame to the world frame or any other suitable reference frame (such as e.g. a reference frame associated with one or more of the receiver 104s), or vice versa, may be performed by apply the appropriate rotation to the data. Similarly, the world frame may have axes fixed to the Earth, such as by aligning the Z axis of the world frame with the gravity vector resulting from Earth's gravity field, pointing from the surface of the Earth to the sky. Although the math and descriptions provided in this disclosure are in the context of these frames, one of skill in the art will realize that similar operations may be performed using other definitions and frames of reference. All the teachings could be redone with different definitions. Thus, the orientation of a portable device may be expressed as the rotational operation that translates the body frame to the world frame, such as a rotation operation that aligns the Z axis of the body frame with the gravity vector. In some embodiments, the rotation operation may be expressed in the form of a unit quaternion. As used herein, the terms "quaternion" and "unit quaternion" may be used interchangeably for convenience. Accordingly, a quaternion may be a four element vector describing the transition from one rotational orientation to another rotational orientation and may be used to represent the orientation of a portable device. A unit quaternion has a scalar term and 3 imaginary terms. In this disclosure, the quaternion is expressed with the scalar term first followed by the imaginary terms but, appropriate modifications may be made to the formulas, equations and operations to accommodate different definitions of quaternion.

Although the present invention has been described in accordance with the embodiments shown, one of ordinary skill in the art will readily recognize that there may be variations to the embodiments and those variations would be within the spirit and scope of the present invention. For example, the techniques of this disclosure have been explained in the context of a HMD and a controller, but the techniques may be applied in any other suitable context. One skilled in the art may readily devise other systems consistent with the disclosed embodiments which are intended to be within the scope of this disclosure.

What is claimed is:

1. A positioning system, comprising:
    a transmitter, the transmitter comprising:
        an acoustic signal transmitter configured to transmit a modulated acoustic signal;
        a magnetic synchronization signal transmitter configured to transmit a modulated magnetic synchronization signal; and
        at least one inertial sensor assembly, having at least one sensor, configured to receive the modulated magnetic synchronization signal as an input, and configured to transmit a inertial signal; and
    a receiver, the receiver comprising:
        an acoustic signal receiver configured to receive the transmitted modulated acoustic signal;
        a magnetic synchronization signal receiver configured to receive the transmitted modulated magnetic synchronization signal;
        an inertial signal receiver configured to receive the transmitted inertial signal; and
        at least one processor configured to receive the modulated acoustic signal from the acoustic signal receiver, the modulated magnetic synchronization signal from the magnetic synchronization signal receiver and the inertial signal from the inertial signal receiver on a same time domain, and configured to determine a position of the transmitter based on the received modulated synchronization signal, a determined time delay of the received modulated acoustic signal and the received inertial signal.

2. The positioning system of claim 1, wherein the at least one processor is configured to determine a position of the transmitter by:
    making an acoustic position determination for the transmitter based on the received modulated synchronization signal and a determined time delay of the received modulated acoustic signal;
    making an inertial position determination for the transmitter based on the received inertial signal, and;
    fusing the acoustic position determination and the inertial position determination.

3. The positioning system of claim 2, wherein the acoustic position determination and the inertial position determination are synchronized based on the modulated magnetic synchronization signal.

4. The positioning system of claim 3, wherein the inertial sensor assembly is configured to receive an indication of the start of the modulated magnetic synchronization signal as an input and determine timing data with respect to the inertial signal.

5. The positioning system of claim 4, wherein the timing data comprises a time delay between the received indication of the start of the modulated magnetic synchronization signal and acquired inertial sensor samples.

6. The positioning system of claim 5, wherein the inertial sensor assembly is further configured to determine a timestamp of the received indication of the start of modulated magnetic synchronization signal based on the time delay.

7. The positioning system of claim 6, wherein the inertial sensor assembly receives the modulated magnetic synchronization signal on a dedicated input.

8. The positioning system of claim 2, wherein the inertial signal is transmitted using radio frequency communication.

9. The positioning system of claim 1, wherein the inertial sensor assembly comprises at least one of an accelerometer and a gyroscope.

10. The positioning system of claim 9, wherein the inertial sensor assembly further comprises a magnetometer.

11. The positioning system of claim 1, wherein the receiver comprises at least one of a virtual reality display and an augmented reality display.

12. The positioning system of claim 11, wherein the transmitter comprises a handheld controller for the receiver.

13. The positioning system of claim 1, further comprising:
    an additional acoustic signal transmitter capable of experiencing independent movement and configured to transmit a modulated acoustic signal;
    a magnetic synchronization signal transmitter configured to transmit a modulated magnetic synchronization signal; and
    at least one inertial sensor assembly, having at least one sensor synchronized with the modulated magnetic synchronization signal and configured to transmit a inertial signal.

14. A portable transmitter comprising:
    an acoustic signal transmitter configured to transmit a modulated acoustic signal;
    a magnetic synchronization signal transmitter configured to transmit a modulated magnetic synchronization signal; and
    at least one inertial sensor assembly, having at least one sensor, configured to receive the modulated magnetic synchronization signal as an input and configured to transmit an inertial signal.

15. The portable transmitter of claim 14, wherein the inertial sensor assembly is configured to receive an indication of the start of the modulated magnetic synchronization signal as an input and determine timing data with respect to the inertial signal.

16. The portable transmitter of claim 15, wherein the timing data comprises a time delay between the received indication of the start of the modulated magnetic synchronization signal and acquired inertial sensor samples.

17. The portable transmitter of claim 16, wherein the inertial sensor assembly is further configured to determine a timestamp of the received indication of the start of modulated magnetic synchronization signal based on the time delay.

* * * * *